(12) United States Patent
Hattori et al.

(10) Patent No.: US 10,404,146 B2
(45) Date of Patent: Sep. 3, 2019

(54) ROTARY ELECTRIC MACHINE

(71) Applicant: TOYOTA JIDOSHA KABUSHIKI KAISHA, Toyota-shi, Aichi-ken (JP)

(72) Inventors: Hiroyuki Hattori, Okazaki (JP); Shinji Wakamatsu, Toyota (JP); Shinya Urata, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 94 days.

(21) Appl. No.: 15/804,566

(22) Filed: Nov. 6, 2017

(65) Prior Publication Data
US 2018/0159408 A1    Jun. 7, 2018

(30) Foreign Application Priority Data
Dec. 1, 2016  (JP) ................. 2016-234275

(51) Int. Cl.
| | | |
|---|---|---|
| *H02K 16/00* | (2006.01) | |
| *H02K 16/02* | (2006.01) | |
| *H02K 1/14* | (2006.01) | |
| *H02K 21/12* | (2006.01) | |
| *H02K 1/27* | (2006.01) | |
| *H02K 21/22* | (2006.01) | |
| *H02K 21/14* | (2006.01) | |

(52) U.S. Cl.
CPC ............. *H02K 16/02* (2013.01); *H02K 1/146* (2013.01); *H02K 1/276* (2013.01); *H02K 1/2786* (2013.01); *H02K 21/12* (2013.01); *H02K 21/22* (2013.01); *H02K 21/14* (2013.01); *H02K 2213/03* (2013.01)

(58) Field of Classification Search
CPC ........ H02K 16/02; H02K 1/146; H02K 1/276; H02K 1/2786; H02K 21/12; H02K 21/14; H02K 21/22; H02K 2213/03
See application file for complete search history.

(56) References Cited

U.S. PATENT DOCUMENTS

| | | |
|---|---|---|
| 6,590,312 B1 | 7/2003 | Seguchi et al. |
| 2004/0113507 A1 | 6/2004 | Yoda et al. |

(Continued)

FOREIGN PATENT DOCUMENTS

| | | |
|---|---|---|
| GB | 2 392 315 A | 2/2004 |
| JP | 2001-268870 A | 9/2001 |

(Continued)

*Primary Examiner* — Yuriy Semenenko
(74) *Attorney, Agent, or Firm* — Sughrue Mion, PLLC (57) ABSTRACT

A rotary electric machine includes: a stator including a stator core and a stator coil wound around the stator core; and an annular outer rotor including an outer core disposed around an outer periphery of the stator and a plurality of outer magnets arranged at intervals in a circumferential direction, in which the stator core has an annular yoke and a plurality of outer teeth protruding radially outward from an outer periphery of the yoke, the outer magnets are magnetized in the circumferential direction such that magnetization directions of the outer magnets adjacent to each other in the circumferential direction are opposite to each other in the circumferential direction, and a circumferential distance of a gap between the outer magnets adjacent to each other is 1.5 times or more a disposition pitch in the circumferential direction of the outer teeth.

5 Claims, 5 Drawing Sheets

(56) References Cited

U.S. PATENT DOCUMENTS

| | | | |
|---|---|---|---|
| 2009/0309442 A1* | 12/2009 | Qu | H02K 16/02 310/114 |
| 2013/0313938 A1 | 11/2013 | Yamada et al. | |
| 2014/0049124 A1* | 2/2014 | Gandhi | H02K 1/246 310/46 |
| 2014/0132099 A1* | 5/2014 | Nakatsugawa | H02K 49/102 310/102 R |
| 2016/0036366 A1* | 2/2016 | Yang | H02K 29/03 318/701 |
| 2016/0079835 A1* | 3/2016 | Aoyama | H02K 16/02 310/68 D |
| 2016/0079836 A1* | 3/2016 | Aoyama | H02K 16/02 310/68 D |
| 2017/0093257 A1* | 3/2017 | Hirata | H02K 1/274 |
| 2017/0117784 A1* | 4/2017 | Guo | H02K 1/246 |
| 2019/0058374 A1* | 2/2019 | Enomoto | H02K 21/24 |

FOREIGN PATENT DOCUMENTS

| | | |
|---|---|---|
| JP | 2005-333727 A | 12/2005 |
| JP | 2009-148109 A | 7/2009 |
| JP | 2012-147601 A | 8/2012 |
| JP | 2013-240146 A | 11/2013 |
| JP | 2016-005412 A | 1/2016 |
| JP | 2016-093052 A | 5/2016 |
| WO | 02/080338 A1 | 10/2002 |

* cited by examiner

ROTARY ELECTRIC MACHINE

INCORPORATION BY REFERENCE

The disclosure of Japanese Patent Application No. 2016-234275 filed on Dec. 1, 2016 including the specification, drawings and abstract is incorporated herein by reference in its entirety.

BACKGROUND

1. Technical Field

The disclosure relates to a rotary electric machine provided with an outer rotor disposed around the outer periphery of a stator.

2. Description of Related Art

As well known, a rotary electric machine has a stator and a rotor that rotates with respect to the stator. Among the rotary electric machines, there is also a rotary electric machine having a rotor disposed around the outer periphery of a stator. As such a rotary electric machine, in addition to an outer rotor type rotary electric machine having one rotor around the outer periphery of one stator (For example, Japanese Unexamined Patent Application Publication No. 2012-147601 (JP 2012-147601 A) or the like), there are a dual rotor type rotary electric machine having two rotors on both sides in a radial direction of one stator, a dual stator type rotary electric machine provided with two stators on both sides in a radial direction of one rotor (For example, Japanese Unexamined Patent Application Publication No. 2016-5412 (JP 2016-5412 A) or the like), and the like.

Here, most of the rotors of the rotary electric machines of the related art have a rotor core and a plurality of magnets, and each of the magnets is magnetized in the radial direction. For example, JP 2012-147601 A discloses an outer rotor type rotary electric machine having one stator and a rotor disposed around the outer periphery of the stator. However, the magnet of the rotor in JP 2012-147601 A is magnetized in the radial direction.

SUMMARY

In the case of the magnet magnetized in the radial direction in this manner, a magnetic field in a direction opposite to the direction of the magnetization is applied to the magnet with application of a current to a stator coil, whereby demagnetization of the magnet is sometimes caused. Specifically, a part of the magnetic flux that is generated with the application of a current to the stator coil flows from teeth to a rotor core or from the rotor core to the teeth. However, the magnetic flux easily flows in the radial direction between the rotor and the teeth. A part of the magnetic flux flowing in the radial direction passes through the magnet. However, if the direction of the magnetic flux passing through the magnet is opposite to the magnetization direction of the magnet, demagnetization occurs in which the magnetic force of the magnet decreases. If the demagnetization occurs, as a matter of course, magnetic torque decreases, and consequently, the output torque of the rotary electric machine decreases.

JP 2016-5412 A discloses a dual stator type rotary electric machine having one rotor and two stators respectively disposed around the outer periphery and the inner periphery of the rotor. A magnet of the rotor in JP 2016-5412 A is magnetized in a circumferential direction. For this reason, according to this configuration, the demagnetization of the magnet described above can be reduced. However, in JP 2016-5412 A, the circumferential interval between the magnets is almost the same as the circumferential interval between the teeth. For this reason, a magnetic path through which a magnetic flux for reluctance torque flows cannot be sufficiently secured in a rotor core, and thus the reluctance torque cannot be secured sufficiently.

The disclosure provides a rotary electric machine that has a rotor disposed around the outer periphery of a stator, and in which it is possible to sufficiently secure reluctance torque while effectively suppressing demagnetization of a magnet of the rotor.

An aspect of the disclosure relates to a rotary electric machine including: a stator including a stator core and a stator coil wound around the stator core; and an annular outer rotor including an outer core disposed around an outer periphery of the stator and a plurality of outer magnets arranged at intervals in a circumferential direction, in which the stator core has an annular yoke and a plurality of outer teeth protruding radially outward from an outer periphery of the yoke, the outer magnets are magnetized in the circumferential direction such that magnetization directions of the outer magnets adjacent to each other in the circumferential direction are opposite to each other in the circumferential direction, and a circumferential distance of a gap between the outer magnets adjacent to each other is 1.5 times or more a disposition pitch in the circumferential direction of the outer teeth.

With such a configuration, the magnetic flux passing through the outer magnet in the direction opposite to the magnetization direction can be reduced, and therefore, demagnetization of the outer magnet can be effectively suppressed. Further, the circumferential distance of the gap between the outer magnets is 1.5 times or more the disposition pitch in the circumferential direction of the outer teeth, and therefore, a magnetic path of a magnetic flux for reluctance torque can be sufficiently secured, so that thus the reluctance torque can be sufficiently secured.

In another aspect, the outer core may include a plurality of core pieces divided from each other, and the rotor may be configured by alternately arranging the core piece and the outer magnet in the circumferential direction.

With such a configuration, there are no cores on both sides in the radial direction of the outer magnet, and therefore, a leakage magnetic flux can be reduced, so that the efficiency of the rotary electric machine can be improved.

In another aspect, the outer magnet may be disposed such that a center of a radial thickness of the outer magnet is located further toward the outside than a center of a radial thickness of the outer core.

With such a configuration, it is possible to increase the gap between the outer magnet and the outer teeth, and thus the demagnetization of the outer magnet can be further reduced.

In another aspect, the rotary electric machine may further include: an annular inner rotor including an inner core disposed around an inner periphery of the stator and a plurality of inner magnets disposed in the circumferential direction, in which the stator core may further have a plurality of inner teeth protruding radially inwardly from an inner circumference of the yoke, and the rotary electric machine may be a dual rotor type.

With such a configuration, the rotary electric machine has two rotors, and therefore, the output torque of the rotary electric machine can be further improved.

In another aspect, the stator coil may be wound such that a polarity of a magnetic field that is formed on the side of the outer teeth when a current is applied and a polarity of a magnetic field that is formed on the side of the inner teeth are the same.

With such a configuration, the magnetic flux flowing through the outer core, the inner teeth, and the outer teeth increases, and therefore, the output of the rotary electric machine can be further improved.

According to the disclosure, the magnetic flux passing through the outer magnet in the direction opposite to the magnetization direction can be reduced, and therefore, the demagnetization of the outer magnet can be effectively suppressed. Further, the circumferential distance of the gap between the outer magnets is 1.5 times or more the disposition pitch in the circumferential direction of the outer teeth, and therefore, the magnetic path of the magnetic flux for reluctance torque can be sufficiently secured, so that thus the reluctance torque can be sufficiently secured.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
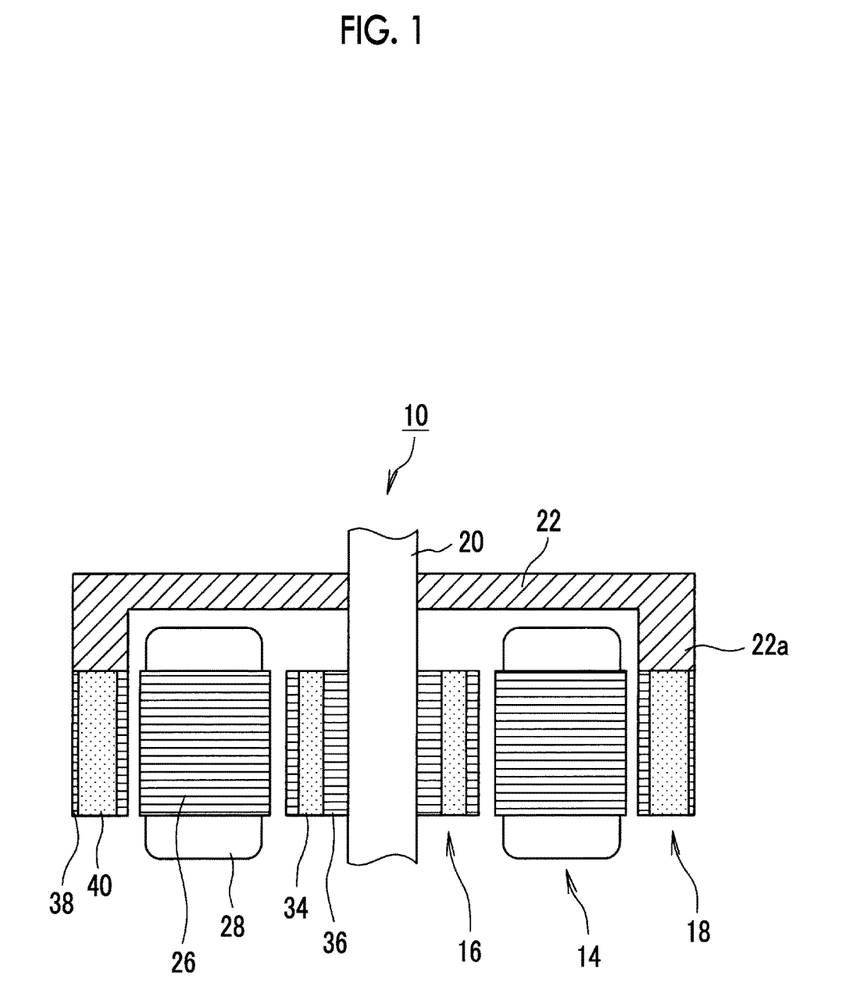
FIG. 1 is a schematic longitudinal sectional view of a rotary electric machine that is an embodiment.
Figure 2:
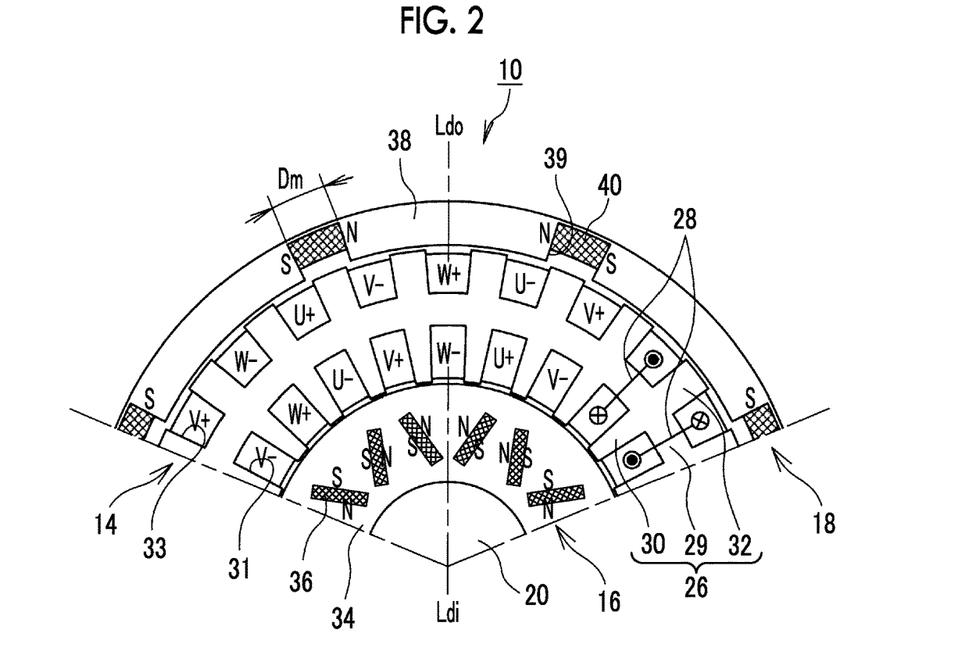
FIG. 2 is a transverse sectional view of the rotary electric machine.

Hereinafter, an embodiment of the disclosure will be described with reference to the drawings. FIG. 1 is a schematic longitudinal sectional view of a rotary electric machine 10 that is a basic embodiment. Further, FIG. 2 is a transverse sectional view of the rotary electric machine 10. The rotary electric machine 10 is a dual rotor type rotary electric machine having one stator 14 and two rotors 16, 18. More specifically, as shown in FIGS. 1 and 2, an inner rotor 16 is fixed to the outer peripheral surface of a rotary shaft 20, the stator 14 is disposed around the outer periphery of the inner rotor 16, and an outer rotor 18 is disposed around the outer periphery of the stator 14.

The outer rotor 18 is fixed to the rotary shaft 20 through a connection member 22. The connection member 22 is a substantially flat plate-shaped member fitted and fixed to the rotary shaft 20. An annular rib 22a extending toward the outer rotor 18 is provided from the surface facing the outer rotor 18, of the connection member 22. The tip face of the annular rib 22a is fixed to the axial end face of the outer rotor 18. Then, the rotating force of the outer rotor 18 is transmitted to the rotary shaft 20 through the connection member 22. The configuration of the connection member 22 shown here is an example, and other configurations may also be made as long as the rotating forces of the outer rotor 18 and the inner rotor 16 are transmitted to the rotary shaft 20. For example, the connection member 22 may have a configuration in which it is fixed to the inner rotor 16 instead of the rotary shaft 20, and in this case, the rotating force of the outer rotor 18 is transmitted to the rotary shaft 20 through the connection member 22 and the inner rotor 16. Further, as another form, a configuration may be made in which the inner rotor 16 is not fixed to the rotary shaft 20, the inner rotor 16 and the outer rotor 18 are fixed to the connection member 22, and the connection member 22 is fixed to the rotary shaft 20. In any case, in the dual rotor type rotary electric machine 10, the rotating forces of the inner rotor 16 and the outer rotor 18 are transmitted to one rotary shaft 20.

The stator 14 has a stator core 26 and a stator coil 28 wound around the stator core 26. The stator core 26 is divided roughly into an annular yoke 29, a plurality of inner teeth 30 protruding radially inward from the inner periphery of the yoke 29, and a plurality of outer teeth 32 protruding radially outward from the outer periphery of the yoke 29, as shown in FIG. 2. A space between two inner teeth 30 adjacent to each other is an inner slot 31, and a space between two outer teeth 32 adjacent to each other is an outer slot 33.

The disposition pitch angle and phase of the inner teeth 30 are the same as the disposition pitch angle and phase of the outer teeth 32. In the illustrated example, both of the inner teeth 30 and the outer teeth 32 are arranged at intervals of 15 degrees in the circumferential direction, and as a whole, twenty-four inner teeth 30 and twenty-four outer teeth 32 are provided. That is, the number of slots on either the inside or the outside is 24. The stator core 26 is configured of a plurality of electromagnetic steel sheets (for example, silicon steel sheets). The electromagnetic steel sheets are positioned and joined to each other, thereby forming the stator core 26.

The stator coil 28 is configured of three-phase coils, that is, a U-phase coil, a V-phase coil, and a W-phase coil. A first end of each of the three-phase coils is connected to an input-output terminal (not shown), and second ends of the three-phase coils are coupled to each other to configure a neutral point. That is, the stator coil 28 has star connection. Of course, instead of the star connection, other connection aspects, for example, delta connection or the like may be adopted.

A winding configuring the coil of each phase is wound around the stator core 26. As methods of winding the winding, distributed winding in which a winding is wound so as to straddle a plurality of slots, concentrated winding in which a winding is wound around one tooth, toroidal winding in which a winding is wound around the yoke 29, and the like are known. In this embodiment, the winding is wound with the toroidal winding, that is, the winding is wound around the yoke 29. In this case, when a current is applied to the stator coil 28, the polarity of a magnetic field that is formed on the side of the outer teeth 32 and the polarity of a magnetic field that is formed on the side of the inner teeth 30 are reversed.

The inner rotor 16 is a rotor that is disposed inside the stator 14, and has an annular inner core 34 and an inner magnet 36 embedded in the inner core 34. The inner core 34 is configured by laminating a plurality of electromagnetic steel sheets (for example, silicon steel sheets). The inner magnet 36 is a permanent magnet configuring the magnetic pole of the inner rotor 16. The inner magnet 36 has a flat and substantially rectangular shape when viewed in an axial direction, and is magnetized in a short side direction thereof. The shape, the number, the disposition position, or the like of the inner magnet 36 is not particularly limited. However, as will be described later, it is desirable that the number of magnetic poles of the inner rotor 16 is the same as the number of magnetic poles of the outer rotor 18. In this embodiment, the inner rotor 16 is provided with eight magnetic poles, and one magnetic pole is configured with two inner magnets 36 disposed in a substantially V-shape opened outward in the radial direction. Therefore, the inner rotor 16 as a whole is provided with the inner magnets 36 of twice the number of magnetic poles, that is, sixteen inner magnets 36. Further, it is desirable that a d-axis Ldi of the inner rotor 16 and a d-axis Ldo of the outer rotor 18 coincide with each other. Here, the d-axis Ldi of the inner rotor 16 is a straight line that connects the circumferential center of the gap between the two inner magnets 36 configuring one magnetic pole and the center point of the rotary electric machine 10.

The outer rotor 18 is a rotor that is disposed around the outer periphery of the stator 14, and is provided with an outer core 38 and a plurality of outer magnets 40. The outer core 38 has a substantially annular shape, and magnet accommodation portions 39 formed by being cut out in a substantially rectangular shape from the inner peripheral side are formed at intervals in the circumferential direction. The outer core 38 is configured by laminating a plurality of electromagnetic steel sheets (for example, silicon steel sheets).

The outer magnet 40 is a permanent magnet configuring the magnetic pole of the outer rotor 18. The outer magnet 40 has a substantially rectangular shape when viewed in the axial direction and is disposed in such a posture that one side of the outer magnet 40 is substantially parallel to the circumferential direction. Then, in this embodiment, the outer magnet 40 is magnetized in a substantially circumferential direction. That is, a first end in the circumferential direction of the outer magnet 40 is the North pole, and a second end in the circumferential direction of the outer magnet 40 is the South pole. Further, the magnetization directions of two outer magnets 40 adjacent to each other in the circumferential direction are set to be opposite directions to each other in the circumferential direction. That is, the two outer magnets 40 adjacent to each other in the circumferential direction are magnetized in such directions that the facing surfaces of the two outer magnets 40 adjacent to each other in the circumferential direction have the same pole. In this case, one magnetic pole is configured by one side portion in the circumferential direction of each of the two outer magnets 40 adjacent to each other in the circumferential direction. In other words, one outer magnet 40 configures a part of one North magnetic pole and also configures a part of one South magnetic pole. Then, the straight line connecting the circumferential center of the gap between the two outer magnets 40 adjacent to each other and the center point of the rotary electric machine 10 becomes the d-axis Ldo of the outer rotor 18.

In this embodiment, the number of magnetic poles of the outer rotor 18 is set to be eight poles that is equal to the number of magnetic poles of the inner rotor 16. For this reason, in the entire outer rotor 18, eight outer magnets 40 are provided. Further, in this embodiment, the d-axis Ldo of the magnetic pole of the outer rotor 18 and the d-axis Ldi of the magnetic pole of the inner rotor 16 are made to coincide with each other. In this manner, if the two d-axes Ldo and Ldi are made to coincide with each other, the angular relationship of the magnetic poles of the rotors 16, 18 with respect to the rotating magnetic field of the stator 14 can be made to be the same on the outer side and the inner side. As a result, switching of control of a current and voltage is not needed on the outer side and the rotor side. Further, in this embodiment, since the stator coil 28 is wound with the toroidal winding, the polarity of the rotating magnetic field that is formed on the stator 14 is reversed on the inner side and the outer side. In this case, the magnetic poles of the inner rotor 16 and the outer rotor 18 that face each other across the stator 14 in the radial direction have the same polarity. That is, the North magnetic pole of the inner rotor 16 is disposed on the side opposite to the North magnetic pole of the outer rotor 18 across the stator 14, and the South magnetic pole of the inner rotor 16 is disposed on the side opposite to the South magnetic pole of the outer rotor 18 across the stator 14.

Figure 3:
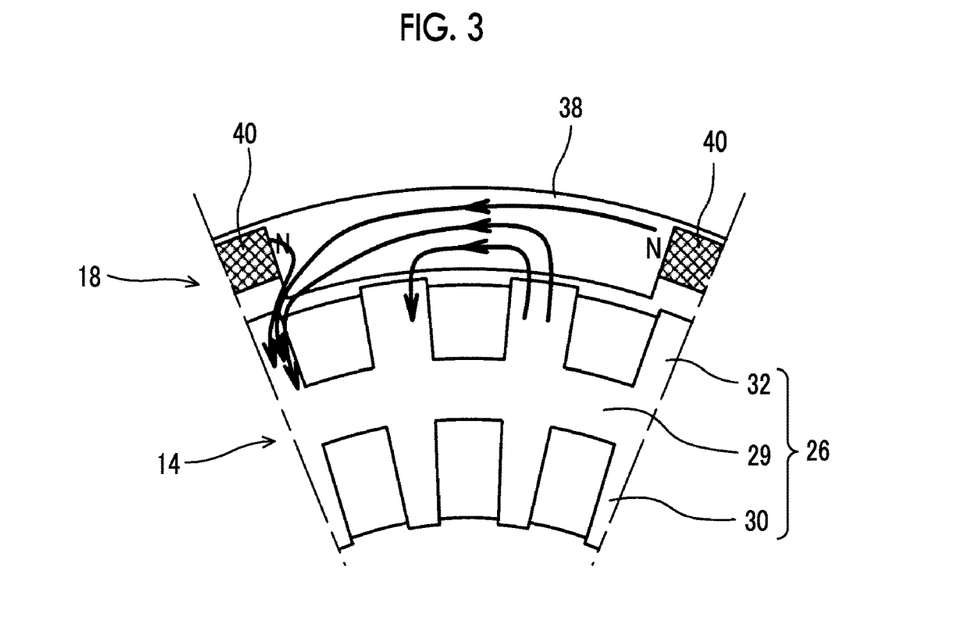
FIG. 3 is an image diagram showing the flow of a magnetic flux in a case where an outer magnet is magnetized in a circumferential direction.
Figure 4:
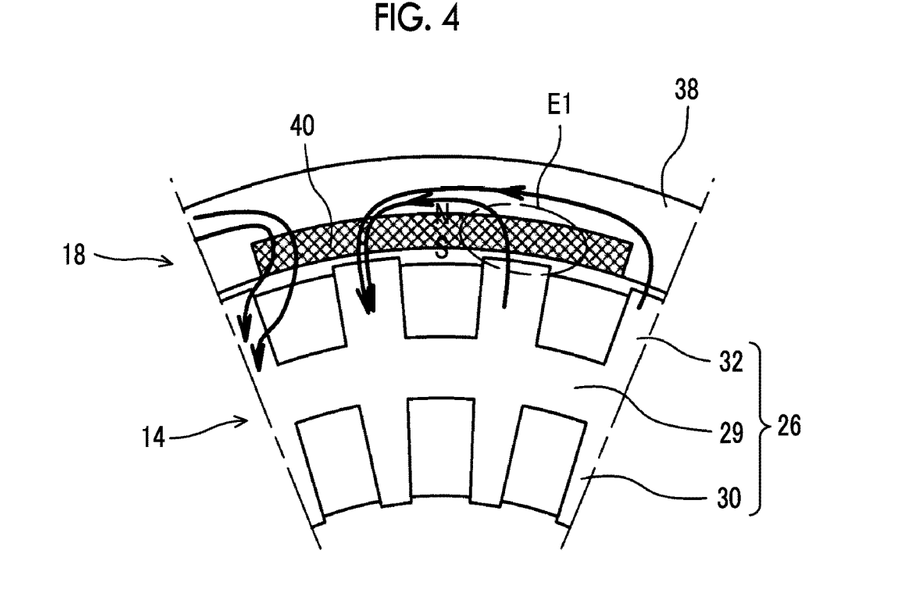
FIG. 4 is an image diagram showing the flow of a magnetic flux in a case where the outer magnet is magnetized in a radial direction.

Here, the reason why the outer magnet 40 is magnetized in the circumferential direction, as in this embodiment, will be described with reference to FIGS. 3 and 4. FIG. 3 is an image diagram showing the flow of a magnetic flux in a case where the outer magnet 40 is magnetized in the circumferential direction, and FIG. 4 is an image diagram showing the flow of a magnetic flux in a case where the outer magnet 40 is magnetized in the radial direction.

A magnetic flux is generated with the application of the three-phase alternating current to the stator coil 28. However, a part of the magnetic flux flows from the outer teeth 32 to the outer rotor 18 or from the outer rotor 18 to the outer teeth 32. That is, a magnetic flux flowing in the radial direction is generated in the outer rotor 18. As shown in FIG. 4, in a case where the outer magnet 40 is magnetized in the radial direction, a so-called "reverse magnetic field" in which a magnetic flux flows in the direction opposite to the magnetization direction of the outer magnet 40 is generated. In the example of FIG. 4, the reverse magnetic field is generated in a region E1. If such a reverse magnetic field is generated, demagnetization occurs in which the magnetic force of the outer magnet 40 decreases. Then, the outer magnet 40 is demagnetized, whereby it causes a decrease in magnetic torque and consequently, a decrease in the output torque of the rotary electric machine 10.

On the other hand, in this embodiment, as described above and as shown in FIG. 3, the outer magnet 40 is magnetized in the circumferential direction, and the outer core 38 instead of the outer magnet 40 is disposed at the central portion of the magnetic pole. In this case, most of the magnetic flux flowing through the outer rotor 18 flows through the outer core 38. Specifically, as the magnetic flux flowing through the outer rotor 18, there is a magnetic flux that flows so as to connect the end portion in the circumferential direction of the outer magnet 40 and specific outer teeth 32, a magnetic flux that flows in from a first outer tooth 32, then proceeds in the circumferential direction in the outer core 38, and thereafter, flows out to a second outer tooth 32, or the like. In this manner, most of the magnetic flux flows through the outer core 38, and the magnetic flux flowing through the outer magnet 40 is small. In other words, in the form of FIG. 3, a magnetic flux that flows to cross the magnetization direction of the outer magnet 40 can be greatly reduced. For this reason, according to the configuration in FIG. 3, the reverse magnetic field can be greatly reduced compared to the case of FIG. 4. As a result, it is possible to effectively prevent a decrease in magnetic torque while preventing the demagnetization of the outer magnet 40. Further, the higher the temperature becomes, the more easily the demagnetization occurs. However, in this embodiment, the heat-resistant temperature of the outer magnet 40 that can prevent the demagnetization can be increased by suppressing the reverse magnetic field. As a result, the current value or the frequency of the three-phase alternating current that is applied to the stator coil 28 can be increased, and thus the output torque of the rotary electric machine 10 can be increased.

Figure 5:
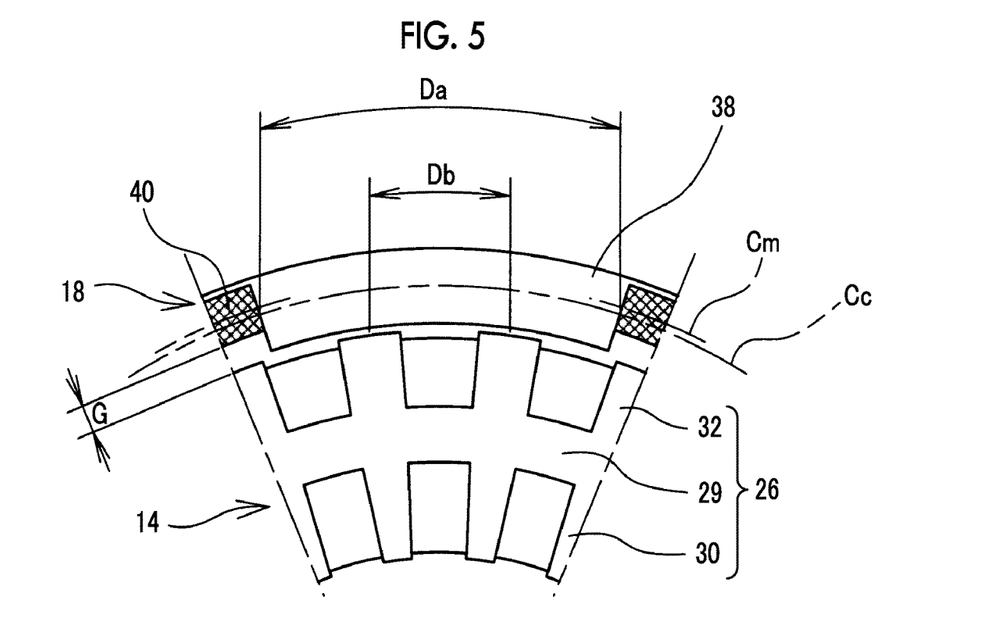
FIG. 5 is a diagram for describing the position and size of the outer magnet.

Next, a desirable size and disposition of the outer magnet 40 will be described with reference to FIG. 5. In order to improve the efficiency of the rotary electric machine 10, it is desirable to utilize not only the magnetic torque by the permanent magnet but also reluctance torque due to the attraction force between a salient pole and the pole of a rotating magnetic field. In this embodiment, in order to sufficiently secure the reluctance torque, a circumferential distance Da of the gap between the outer magnets 40 adjacent to each other in the circumferential direction is set to be 1.5 times or more a circumferential disposition interval Db of the outer teeth 32, that is, to have the relationship of Da≥1.5×Db. In this manner, in a case where the circumferential distance Da is set to have the relationship of Da≥1.5×Db, at least two outer teeth 32 face the gap portion between the magnets, and thus a wider magnetic path of the magnetic flux for the reluctance torque can be secured. In this way, sufficient reluctance torque can be secured. The magnetic flux for the reluctance torque is a magnetic flux flowing from a first outer tooth 32 to a second outer tooth 32 via the outer core 38 without passing through the outer magnet 40.

However, if the circumferential distance Da of the gap portion between the magnets is increased, the magnetic force of the outer magnet 40 decreases and the reverse magnetic field increases. That is, when the number of magnetic poles of the outer rotor 18 is the same, the larger the circumferential distance Da, the smaller the circumferential length Dm (refer to FIG. 2) of the outer magnet 40 becomes, and consequently, the size of the outer magnet 40 is reduced. If the size of the outer magnet 40 is reduced, a decrease in magnetic force and a decrease in magnetic torque are caused accordingly. Further, according to simulation performed by changing the circumferential length Dm of the outer magnet 40, the longer the circumferential length Dm, the further the reverse magnetic field is reduced. Therefore, considering securement of sufficient magnetic torque or prevention of reduction in reverse magnetic field, it is desirable that the circumferential distance Da of the gap portion between the magnets is not excessively large. Therefore, for example, it is desirable that the circumferential distance Da of the gap portion between the magnets is about three times (Da≅3×Db) the circumferential disposition interval Db of the outer teeth 32.

Further, according to simulation performed by changing a gap G between the outer magnet 40 and the stator core 26 (the outer teeth 32), the larger the gap G, the further the reverse magnetic field tends to decrease. For this reason, in order to further reduce the reverse magnetic field, it is desirable that the outer magnet 40 is disposed such that a center Cm of the radial thickness thereof is located further toward the outside in the radial direction than a center Cc of the radial thickness of the outer core 38, as shown in FIG. 5. With such disposition, the gap G can be further increased, and consequently, the demagnetization can be further reduced.

As described above, according to this embodiment, the outer magnet 40 is magnetized in the circumferential direction and in the direction opposite to the magnetization direction of the other outer magnet 40 adjacent thereto in the circumferential direction, and therefore, the demagnetization of the outer magnet 40 is effectively prevented, and the heat-resistant temperature of the outer magnet 40 can be improved. As a result, the output torque of the rotary electric machine 10 can be further improved. Further, in this embodiment, the circumferential distance Da of the gap between two outer magnets 40 adjacent to each other in the circumferential direction is set to be 1.5 times or more the circumferential disposition interval Db of the outer teeth 32. For this reason, it is possible to sufficiently secure the magnetic path of the magnetic flux for the reluctance torque, and thus it is possible to sufficiently secure the reluctance torque. Further, the outer magnet 40 is disposed such that the center Cm of the radial thickness thereof is located further toward the outside than the center Cc of the radial thickness of the outer core 38. As a result, the gap G between the outer magnet 40 and the outer teeth 32 can be increased, and thus the reverse magnetic field can be further reduced.

Figure 6:
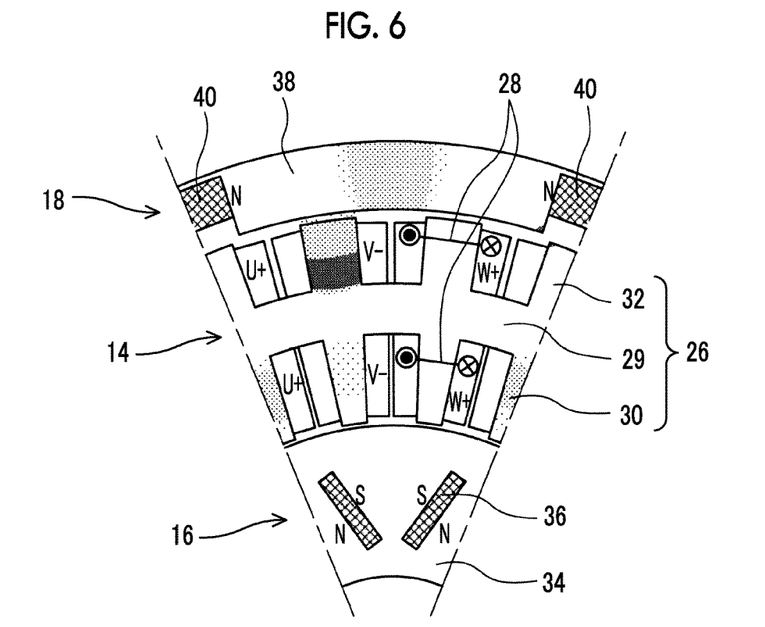
FIG. 6 is a diagram showing another winding method and magnetic flux density of a stator coil.
Figure 7:
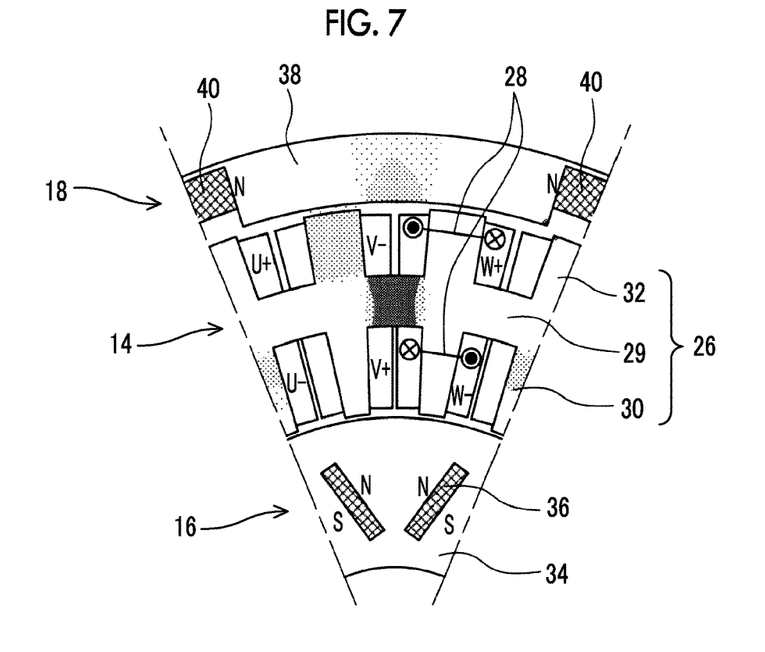
FIG. 7 is a diagram showing another winding method and magnetic flux density of the stator coil.

Next, modification examples of this embodiment will be described. In the above description, the stator coil 28 is wound with the toroidal winding. However, the stator coil 28 may be configured by other winding methods. For example, the stator coil 28 may be configured with distributed winding in which a winding is wound so as to straddle a plurality of slots. Further, as another form, the stator coil 28 may be configured with concentrated winding in which a single coil formed by winding a winding around the teeth 30 and a single coil formed by winding a winding around the teeth 32 are connected by a crossover wire, as shown in FIGS. 6 and 7. Further, as the concentrated winding, there are a method in which the winding directions of windings are the same on both the outer side and the inner side, as shown in FIG. 6, and a method in which the winding directions of windings are the opposite directions on the outer side and the inner side, as shown in FIG. 7.

In the case of FIG. 6, when a three-phase alternating current is applied to the stator coil 28, the rotating magnetic field that is formed on the inner side and the rotating magnetic field that is formed on the outer side have the same polarity. In the following, a form in which the polarity of the rotating magnetic field is the same on the outer side and the inner side is referred to as a "same polarity method". In the case of the same polarity method, it is desirable that the magnetic poles of the inner rotor 16 and the outer rotor 18 which face each other in the radial direction across the stator 14 have opposite polarities to each other. That is, as shown in FIG. 6, the South magnetic pole of the inner rotor 16 is disposed on the side opposite to the North magnetic pole of the outer rotor 18 across the stator 14.

Further, in the case of FIG. 7, when a three-phase alternating current is applied to the stator coil 28, the polarities of the magnetic field that is formed on the inner side and the magnetic field that is formed on the outer side are opposite to each other. In the following, a form in which the polarities of the rotating magnetic fields are opposite to each other on the outer side and the inner side is referred to as a "reverse polarity method". The reverse polarity method is applicable in not only a case where the stator coil 28 is wound as shown in FIG. 7 but also a case where the stator coil 28 is wound with the toroidal winding, as shown in FIG. 2. In the case of the reverse polarity method, it is desirable that the magnetic poles of the inner rotor 16 and the outer rotor 18 which face each other in the radial direction across the stator 14 have the same polarity. That is, as shown in FIGS. 2 and 7, the North magnetic pole of the inner rotor 16 is disposed on the side opposite to the North magnetic pole of the outer rotor 18 across the stator 14.

Here, in FIGS. 6 and 7, a black hatched portion indicates a portion where magnetic flux density is high when a current is applied to the stator coil 28, and the darker the black is, the higher the magnetic flux density is. As is apparent from the comparison between FIG. 6 and FIG. 7, it can be seen that the magnetic flux flowing through the outer core 38 and the teeth 30, 32 further increases in the same polarity method shown in FIG. 6 than in the reverse polarity method shown in FIG. 7. In this manner, if the magnetic flux flowing through the outer core 38 and the teeth 30, 32 increases, output torque increases accordingly. Therefore, in a case where it is desired to increase the output torque of the rotary electric machine 10, it is desirable to adopt the reverse polarity method in which the polarities of the rotating magnetic fields that are formed are opposite to each other on the outer side and the inner side, as shown in FIG. 6. However, of course, the same polarity method may be adopted as needed.

Figure 8:
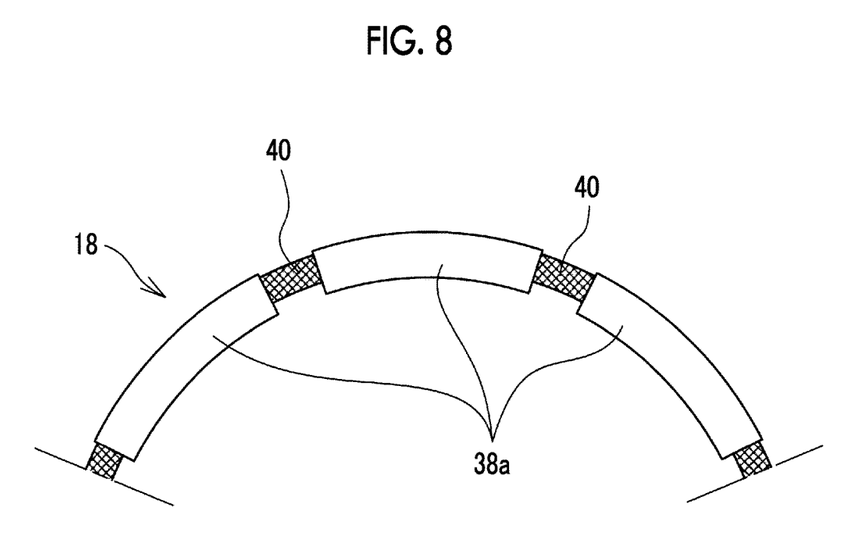
FIG. 8 is a diagram showing another example of an outer rotor.

Further, in the above description, the outer core 38 is formed as a substantially annular single member. However, the outer core 38 may be configured with a plurality of core pieces 38a divided from each other. That is, as shown in FIG. 8, the outer rotor 18 may be configured by alternately disposing the core piece 38a and the outer magnet 40 in the circumferential direction. In this case, a core does not exist on the outside in the radial direction of the outer magnet 40, and therefore, a leakage magnetic flux decreases, as compared with the case shown in FIG. 2, in which the core exists on the outside in the radial direction. As a result, the magnetic flux can be utilized more efficiently, and thus the efficiency of the rotary electric machine 10 can be improved.

Figure 9:
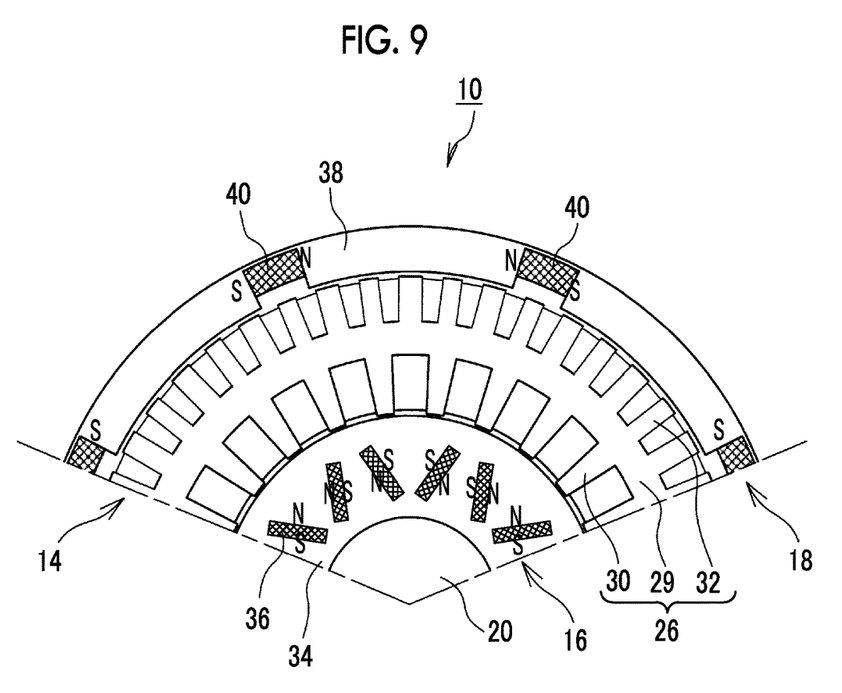
FIG. 9 is a diagram showing another example of the rotary electric machine.

Further, in the above description, the number of inner teeth 30 and the number of outer teeth 32 are set to be the same number. However, the number of inner teeth 30 and the number of outer teeth 32 may be different from each other. For example, as shown in FIG. 9, the number of outer teeth 32 (the number of slots on the outer side) may be set to be twice the number of inner teeth 30 (the number of slots on the inner side). Further, the number of magnetic poles and the number of slots described above are examples and may be appropriately changed. Further, it is desirable that the phases of the outer teeth 32 and the inner teeth 30 are the same. However, there may be a phase difference in the phases of the outer teeth 32 and the inner teeth 30. In this case, it is desirable to provide a phase difference between the magnetic pole of the inner rotor 16 and the magnetic pole of the outer rotor 18 according to the phase difference between the inner tooth 30 and the outer teeth 32.

Further, in the above description, the dual rotor type rotary electric machine 10 having two rotors 16, 18 on both sides in the radial direction of one stator 14 has been described. However, the technique of this embodiment may be applied to rotary electric machines of other forms as long as they have a rotor disposed further toward the outside in the radial direction than a stator. For example, the technique of this embodiment may be applied to an outer rotor type rotary electric machine having one rotor on the outside of one stator, a dual stator type rotary electric machine having two stators on both sides in the radial direction of one rotor, or the like. Further, in the above description, merely the outer magnet 40 is magnetized in the circumferential direction. However, the inner magnet 36 may be magnetized in the circumferential direction. Further, the embodiment and the modification examples described above may be appropriately combined as long as there is no inconsistency to each other. Therefore, for example, in the configuration shown in FIG. 2, the winding method of the stator coil 28 may be changed to the method shown in FIG. 6, and the outer core 38 may be configured with the core pieces 38a, as shown in FIG. 8.

What is claimed is:

1. A rotary electric machine comprising:
   a stator including a stator core and a stator coil wound around the stator core; and
   an outer rotor having annular shape, the outer rotor including an outer core disposed around an outer periphery of the stator and a plurality of outer magnets arranged at intervals in a circumferential direction, wherein:
   the stator core has an annular yoke and a plurality of outer teeth protruding radially outward from an outer periphery of the yoke;
   the outer magnets are magnetized in the circumferential direction such that magnetization directions of the outer magnets adjacent to each other in the circumferential direction are opposite to each other in the circumferential direction; and
   a circumferential distance of a gap between the outer magnets adjacent to each other is 1.5 times or more a disposition pitch in the circumferential direction of the outer teeth.

2. The rotary electric machine according to claim 1, wherein:
   the outer core includes a plurality of core pieces; and
   the outer rotor is configured by alternately arranging the core piece and the outer magnet in the circumferential direction.

3. The rotary electric machine according to claim 1, wherein the outer magnet is disposed such that a center of a radial thickness of the outer magnet is located further toward the outside than a center of a radial thickness of the outer core.

4. The rotary electric machine according to claim 1, further comprising:
   an inner rotor having annular shape, the inner rotor including an inner core disposed around an inner periphery of the stator and a plurality of inner magnets disposed in the circumferential direction, wherein:
   the stator core further has a plurality of inner teeth protruding radially inwardly from an inner circumference of the yoke; and
   the rotary electric machine is a dual-rotor motor.

5. The rotary electric machine according to claim 4, wherein the stator coil is wound such that a polarity of a magnetic field that is formed on the side of the outer teeth when a current is applied and a polarity of a magnetic field that is formed on the side of the inner teeth are the same.

* * * * *